US006958182B2

(12) United States Patent
Hasecke et al.

(10) Patent No.: US 6,958,182 B2
(45) Date of Patent: Oct. 25, 2005

(54) FLOOR OR WALL COVERING FROM CERAMICS, WOOD, PLASTIC, NATURAL OR ARTIFICIAL STONE, AND A TILE OR PANELS USED FOR THE SAME

(76) Inventors: Guido Hasecke, Burlear Strasse, Sättelstät (DE), 99848; Heinrich Hasecke, Burlear Strasse, Sättelstät (DE), 99848

( * ) Notice: Subject to any disclaimer, the term of this patent is extended or adjusted under 35 U.S.C. 154(b) by 257 days.

(21) Appl. No.: 10/246,442

(22) Filed: Sep. 18, 2002

(65) Prior Publication Data

US 2003/0077417 A1 Apr. 24, 2003

Related U.S. Application Data

(63) Continuation of application No. PCT/DE01/01062, filed on Mar. 20, 2001.

(30) Foreign Application Priority Data

Mar. 20, 2000 (DE) .......................................... 100 13 496

(51) Int. Cl.[7] .............................. B44C 3/12; F21S 8/00
(52) U.S. Cl. ........................ 428/67; 428/167; 362/147; 362/153; 362/800
(58) Field of Search ................................ 362/153, 364, 362/800, 147; 428/67, 167

(56) References Cited

U.S. PATENT DOCUMENTS 5,095,412 A     3/1992   French

FOREIGN PATENT DOCUMENTS

DE   37 30 893    3/1989
JP   03147970     6/1991

OTHER PUBLICATIONS

"Operating Manual—Barnant/Ponndorf: Hose Pumps," Barnant Company, Edition 02.
"Barnant/Ponndorf: Hose Pumps," Barnant Company.
"Barnant/Ponndorf—Hose Pumps: Performance Curves and Technical Data,".

*Primary Examiner*—Stephen Kalafut
*Assistant Examiner*—Jane Rhee

(57) ABSTRACT

The floor wall covering made from ceramics, wood, plastic, natural or artificial stone, has at least one inlay illuminated with optical waveguides. A tile or panel inlay is illuminated by light from the optical waveguide. At least one recess (12) is provided in the floor or wall covering in which a tile or panel inlay is inserted. The tile or panel inlay is made of transparent material or made of a diffuse reflecting fiber or made of diffused reflecting fiber optical elements and in the optical waiveguide directs light from a remote source to the inlay.

11 Claims, 6 Drawing Sheets

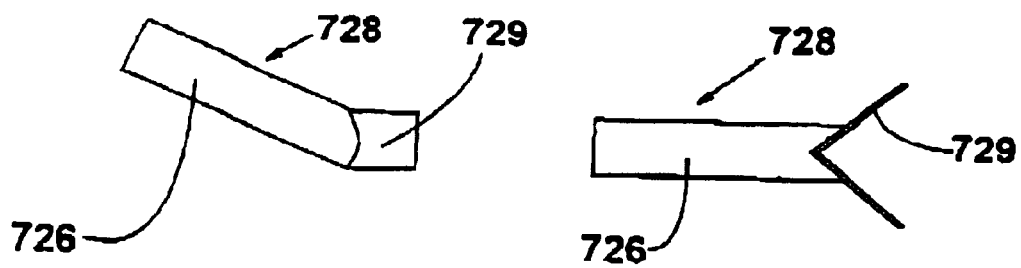
Fig. 7a   Fig. 7b

FLOOR OR WALL COVERING FROM CERAMICS, WOOD, PLASTIC, NATURAL OR ARTIFICIAL STONE, AND A TILE OR PANELS USED FOR THE SAME

FIELD OF THE INVENTION

The present invention relates to a floor or wall covering from ceramics, wood, plastic, natural or artificial stone, with inlays illuminated by means of optical waveguides, and to tiles and panels used for the same.

In addition to the particular aesthetic impression, such floor or wall coverings provide at least a certain basic illumination in the room in which they are installed; they can therefore be utilized as an emergency lighting and/or to illuminate the escape routes in public buildings without any disturbing effect. Since the illumination is achieved without directly using current, these coverings are ideal for use in sanitary units.

DESCRIPTION OF THE PRIOR ART

DE 37 30 893 A1 for example describes a floor covering with inserted inlays, optical waveguides cast in the inlay connecting said inlay to a remote light source and illuminating it from within. This covering is very expensive to manufacture though, since this requires either the length and the arrangement of the optical waveguides to be inserted to be known, which makes planning and production more difficult, or the optical waveguides to be arranged on the inlay with a maximum length and to be cut to the desired length subsequently, on the job site. Both alternatives are complicated and expensive. Alternatively, the inlay could also be manufactured on the job site, which is even more complicated and expensive.

In the Patent Abstracts of Japan, Volume 015, No. 370 (M-1159) & JP-A-03147970 there is described a plastic tile provided with a plurality of locations. A glass brick is set in each of these locations, an optical waveguide through which the light of a remote light source is led into the glass brick being connected to a respective one of said bricks on the underside thereof so that the brick is lightened. The optical waveguide is thereby guided parallel to the tile between said tile and the bottom, deviated at an angle of 90.degree, in the region of the corresponding glass brick, and introduced into the tile at right angles to the underside thereof. There, the optical waveguide impinges on the underside of the glass brick as soon as the optical waveguide exits the tile and enters the location.

The glass brick of this tile is not sufficiently illuminated so that a plurality of glass bricks are provided in said tile in an effort to produce enough light. To illuminate this plurality of glass bricks, a very large quantity of optical waveguides is also needed so that the manufacturing coat of such a tile is very high. In view thereof, the present invention is based on the finding that high transmission losses occur because of the strong deviation of the optical waveguide in the region of the glass brick.

BRIEF SUMMARY OF THE INVENTION

In view thereof, it is the object of the present invention to provide a floor or wall covering illuminated by optical waveguides and tiles and panels therefor which needs only a few optical waveguides thanks to a good light efficiency so that the covering can be manufactured and mounted at low cost.

The technical solution to this problem suggested in accordance with the invention is to develop the floor or wall covering mentioned herein above by providing a tile or panels configured according to the features recited in claim 1.

The advantage of a tile or panels configured according to this technical teaching is that the inlay and the optical waveguide can be manufactured independent of each other and that they are only combined on the job site when the whole covering is being installed. Accordingly, the inlay and/or the tile or the panels can be prefabricated in a plant according to the client's wishes, the optical waveguide being cut to an accurately sized length and added on the job site, when the covering is being installed, which saves material and facilitates the process, thus reducing the cost for providing said covering.

In accordance with the invention there is provided, on the underside of the tile or of the panels, a location for receiving a free end of the optical waveguide, one side of the location opening into the recess. The advantage thereof is that the free end of the optical waveguide is accommodated in the location where it is protected and, above all, that the free end of the optical waveguide is brought on purpose to the small side of the inlay in order is to ensure the best possible entry of light into the inlay.

The entry of light into the inlay is further improved in that a portion of the location facing the inlay is oriented parallel to the underside, the location being, apart from that, arranged diagonally so that another side of the location opens into the underside of the tile or of the panels.

In another, preferred embodiment, the optical waveguide is arranged on a corner of the inlay. The advantage thereof is that the light introduced into the inlay is evenly distributed therein, providing a good illumination.

In still another preferred embodiment, the inlay and/or the optical waveguide are polished in the contact region. This permits to achieve a good transfer of light from the optical waveguide to the inlay.

In still another preferred embodiment, several optical waveguides are combined into a beam. This beam can advantageously be guided in a groove provided in the rear side of the floor or wall covering. The advantage thereof is that the beam is received in the covering in such a manner that it does not protrude. Accordingly, it is made certain that the covering and the beam are properly laid.

In another preferred embodiment, the inlay is made from glass, acrylic, PVC or another plastic, the rear side thereof being preferably rough and untreated and the front side being preferably smooth and polished. Thanks to the smooth and polished configuration of the front side, the light introduced can exit the inlay with little loss and so as to be clearly visible, whereas light rays impinging on the rear side of the inlay are reflected toward the front side so that the onlooker has an impression of great depth, In a preferred development, the inlay is provided on its rear side with a colouring layer, preferably with a vapour-deposited layer of gold or with a colour layer that is varnished or bonded thereon. As a result thereof, the light rays impinging on the rear side are reflected in the respective colour so that the onlooker sees the inlay in the corresponding colour. This is how coloured inlays are provided.

In still another preferred development, this motif is configured to form an emergency lighting, e.g., in representing arrows or the like, in order to assist people in the building in finding the emergency exit. This emergency lighting is inexpensive to manufacture, easy to service (as it is centrally accessible) and uses but little current as the whole emergency lighting can be supplied by one single lighting source.

Further advantages of the tile or the panel in accordance with the invention and of the covering of the invention will become apparent in the accompanying drawing and in the embodiments described herein after. The afore mentioned features as well as those still to be mentioned can be used either alone or in any combination. The embodiments mentioned are to be considered only as illustrative and not restrictive.

BRIEF DESCRIPTION OF THE SEVERAL VIEWS OF THE DRAWINGS

FIG. 3a is a side view of the sleeve;

FIG. 3b is a top view of the sleeve according to FIG. 3a;

FIG. 7a is a side view of the sleeve in a second embodiment;

FIG. 7b is a top view of the sleeve according to FIG. 7a.

DETAILED DESCRIPTION OF THE INVENTION

Figure 1:
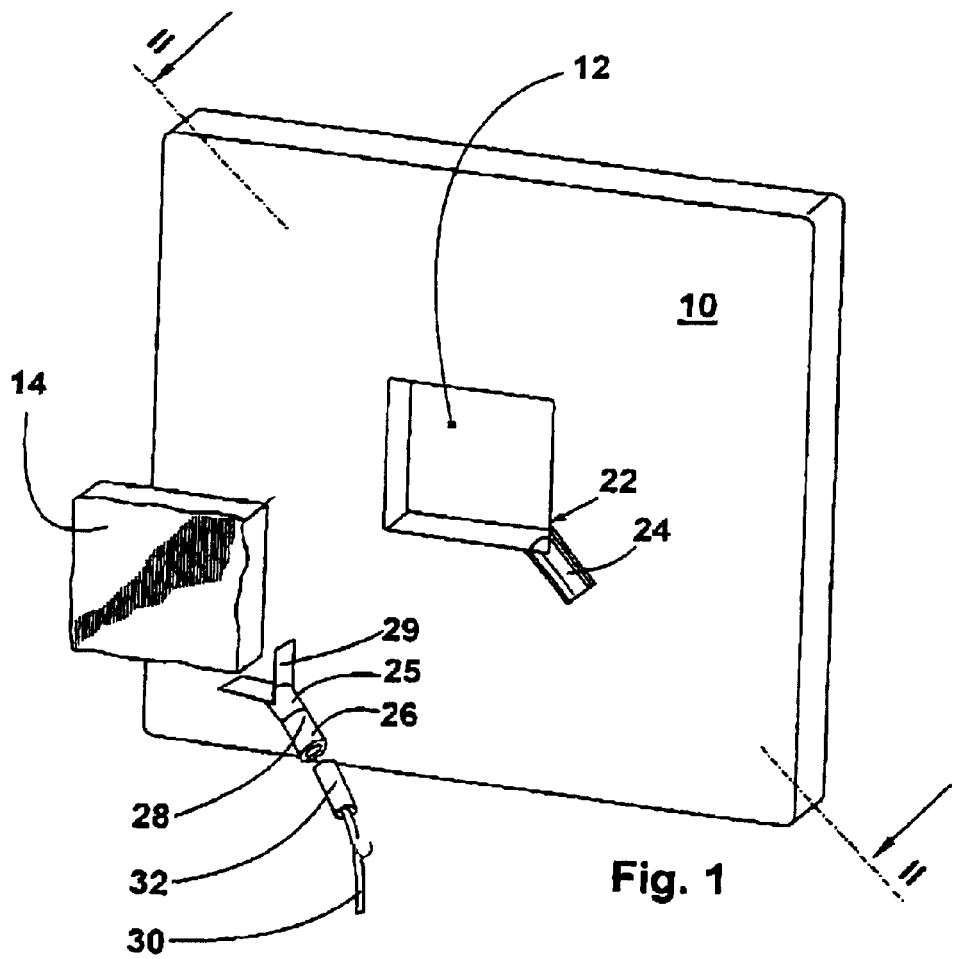
FIG. 1 is an exploded view of a tile for building a floor or wall covering.
Figure 2:
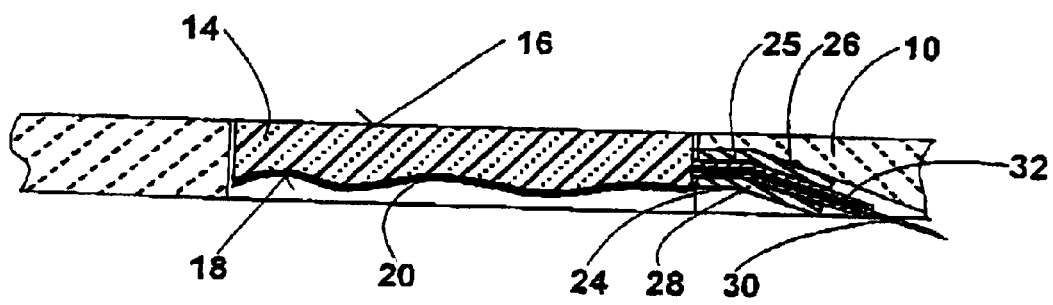
FIG. 2 is a sectional side view of the tile according to FIG. 1, taken along line II—II in FIG. 1.

The FIGS. 1 and 2 illustrate a tile 10 from ceramics, plastic, natural or artificial stone provided with a square recess 12 for receiving a square inlay 14 made from glass. The inlay 14 is thereby bonded into the tile 10, preferably by means of epoxy resin. The front side 16 of said inlay 14 is polished and its rear side 18 untreated. Furthermore, a layer 20 of gold is vapour-deposited onto the rear side 18 in order to give the light a light golden shade.

A location 24 is diagonally let in the underside of the tile 10, on the edge of the recess 12 in a corner 22, the one front side of said location opening into the recess 12 whereas the other front side runs into the underside of the tile 10. An accordingly shaped sleeve 28 is insertable into said location 24 and fixates the free end of an optical waveguide 30, retaining it in the proper position. As can be surveyed from the FIGS. 3a and 3b the location 24 and the sleeve 28 are kinked in the same way so that a first section 25 is oriented parallel to the underside of the tile 10 whereas a second section 26 is oriented diagonally. Accordingly, the first section 25 runs toward the inlay 14 into the recess 12 and the second section 26 into the underside of tile 10.

A guide element 29 with a V-shaped cross-section is arranged on the sleeve 28, on the side of the inlay. With this guide element 29, the sleeve 28 may be placed form-fittingly against a corner of the inlay 14 so that the optical waveguide 30 contained in the sleeve 28 can be brought as far as possible into close proximity to the inlay 14 where it can be reliably retained in this position.

The surface of the region of the small side of the inlay 14 on which the optical waveguide 30 abuts is polished in order to ensure a good transition of the light.

The free end of the optical waveguide 30 is provided with a sleeve 32 for protection, said sleeve being form-fittingly insertable into the sleeve 28 where it is clampingly held. The free end of the optical waveguide 30 is polished for enhanced transmission of the light.

In the assembled condition, the light of a light source which is not illustrated herein is conducted, via the optical waveguide 30, into the inlay 14 where it is distributed. Light rays impinging onto the rear side 18 of the inlay 14 are thereby reflected in gold by the vapour-deposited gold layer 20 and, together with other light rays, exit the polished surface of the front side 16 to the exterior. As a result thereof, the illuminated inlay 14 appears to be of a light golden colour and not cold white in colour.

Figure 4:
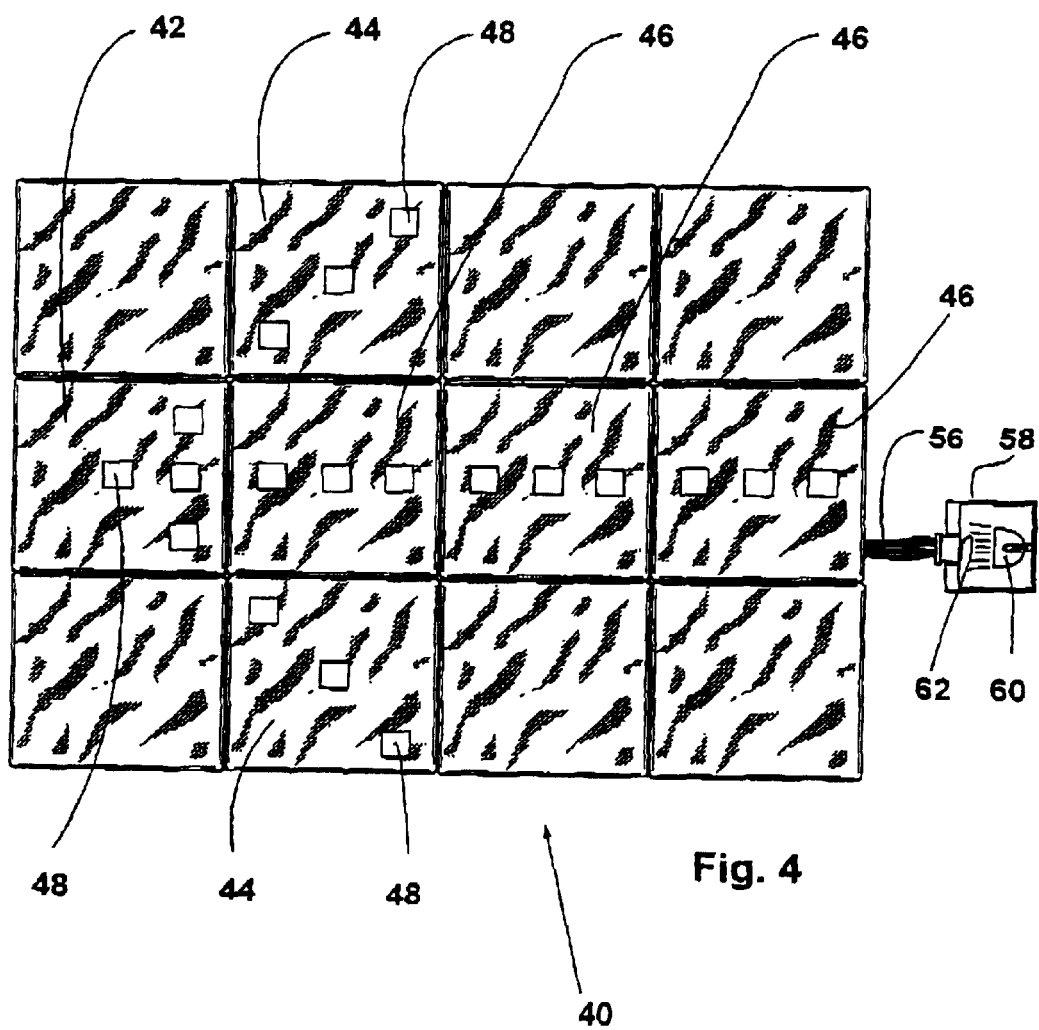
FIG. 4 is a front view of a floor or wall covering in accordance with the invention.
Figure 5:
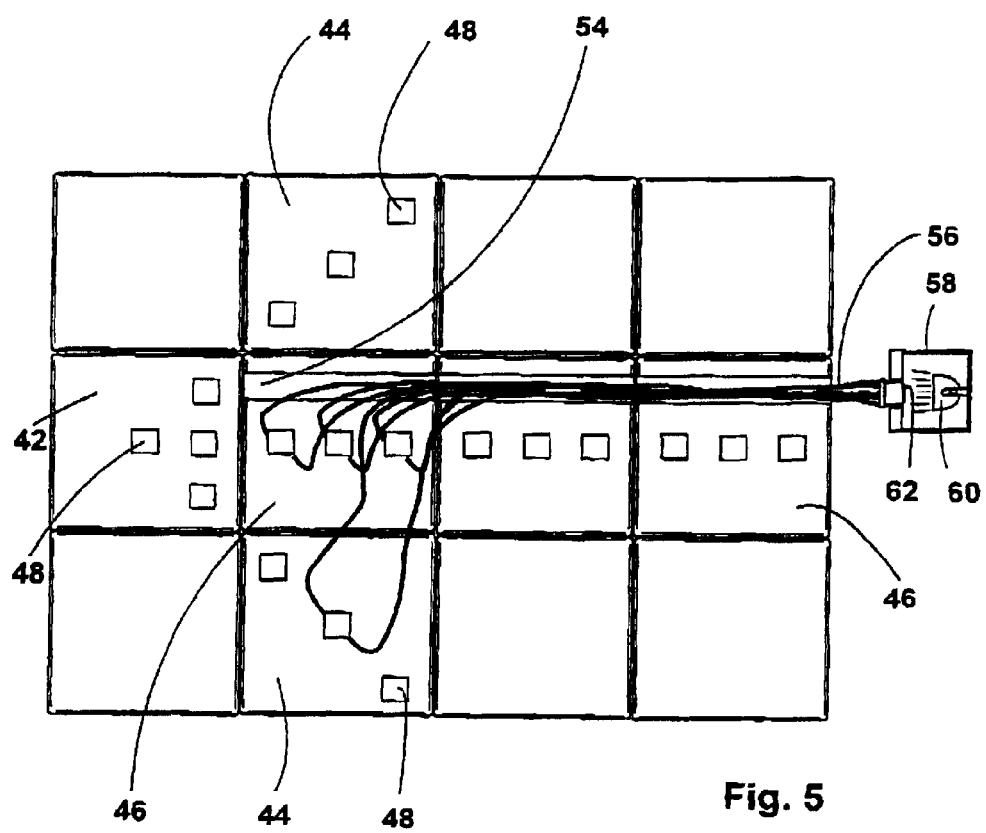
FIG. 5 is a rear view of the covering according to FIG. 4.
Figure 6:
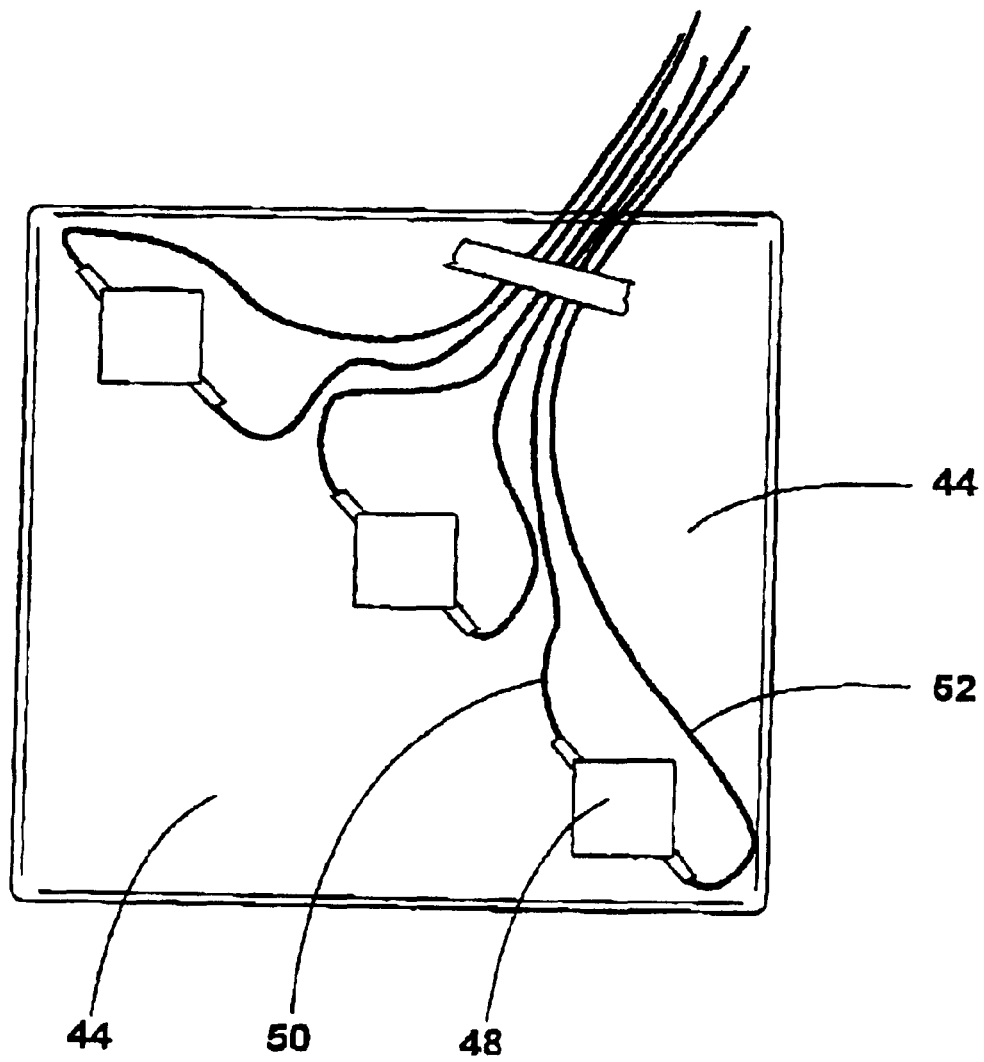
FIG. 6 is an enlarged rear view of a tile of the covering according to FIG. 4.

The FIGS. 4 through 6 show a covering 40 for floors or walls composed of several tiles 42, 44, 46. It goes without saying that said tiles 42, 44, 46 are similar in technical essence to the tiles 10 according to the FIGS. 1 and 2. As a matter of course, the outer shape of the inlay and the number and arrangement of the inlays inserted can be varied according to the motif desired.

Together with differently arranged inlays 48, various tiles 42, 44, 46 were incorporated into the covering 40 in such a manner that all the inlays 48 together represent an arrow. As more specifically shown in FIG. 6, two optical waveguides 50, 52 are connected to each inlay in order to achieve very good illumination. All of the waveguides 50, 52 are then led to a central groove 54 incorporated in the rear side of the tile 46 where they are combined into a beam 56. For the protection of the optical waveguides 50, 52 the beam 56 is provided with a protective sheath in the form of a helical metal coating.

For reasons of economy of drawing, and more specifically for the sake of clarity, only some optical waveguides are shown in FIG. 5, leading to the inlay. As a matter of course, all of the inlays are connected to two optical waveguides although this is not explicitly shown.

The beam 56 is then conducted over almost any distance to a light box 58 accommodating a light source 60, preferably a low voltage halogen lamp. The end 62 of the beam 56 is cut clean and polished for a good reception of the desired light. At a certain distance from the end 62 of the beam 56, the light source 60 is arranged in such a manner that the light impinges as far as possible vertically onto the end 62 so that the light is guided to the inlay 48 with the least possible loss.

It goes without saying that, in other embodiments, the inlay can be given any other shape and that several inlays may be combined into another motif. The artistic freedom of the designer is thereby unlimited.

It also goes without saying that such coverings can be set in wainscots, linoleum, parquet or other wooden floors as well.

Figures 3A, 3B:
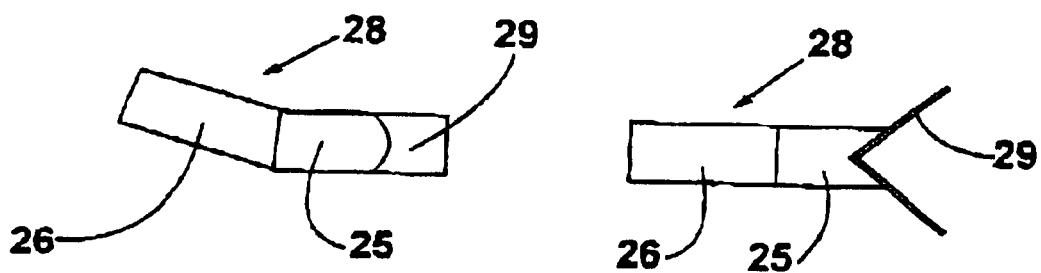

The FIGS. 7a and 7b show an alternative embodiment of the sleeve 28 according to the FIGS. 3a and 3b which is, unlike said sleeve 28, not kinked, but of a straight configuration. The sleeve 728 comprises a straight, hollow cylindrical section 726 with a guide element 729 arranged thereon. The guide element 729 is thereby arranged slightly diagonally on the section 726 so that the guide element 729 from-fittingly abuts on the inlay and so that the section 726 is insertable into the location provided on the underside of the tile in a corresponding diagonal direction. As a matter of course, the location can be either kinked—as shown in FIG. 2—or straight in the manner of sleeve 728.

LIST OF NUMERALS 10 tile
12 recess 14 inlay
16 front side
18 rear side
20 layer
22 corner
24 location
25 section
26, 726 section
28, 728 sleeve
29, 729 guide element
30 optical waveguide
32 sleeve
40 covering
42 tile
44 tile
46 tile
48 inlay
50 optical waveguide
52 optical waveguide
54 groove
56 beam
58 light box
60 light source
62 end

We claim:

1. A floor or wall tile made from ceramics, natural or artificial stone or a panel from wood or plastic and having an outer, generally flat, surface and an underside and at least one recess (12) into which an illuminatable inlay (14, 48) made from a transparent material or from a diffuse reflecting fiber optic element is inserted, said inlay having an outer, generally flat, surface which is arranged generally parallel with the tile outer surface and having a side surface, an optical wave guide (30, 50, 52) connecting said inlay (14, 48) to a remote light source (60) being mounted on said side surface of the inlay (14, 48) and extending generally parallel to said outer surfaces, said underside of the tile (10) or of the panels having a groove (24) for receiving a free end of the optical wave guide (30) in said underside of the tile (10) or of the panels and opening into a side of the recess (12), a front section (25) of the groove (24) facing the inlay being oriented parallel to the outer surfaces so that the optical wave guide (30, 50, 52) is mounted to said side surface of the inlay (14, 48) and a rear or second section (26) of the groove (24) being arranged diagonally so that said rear section of the groove (24) opens into the underside of the tile (10) or of the panels, so that light is directed into the inlay in a direction generally parallel to a plane containing the outer surfaces of the inlay and the tile.

2. The tile or panel according to claim 1, characterized in that the optical wave guide (30) is mounted on a corner (22) of the inlay (14).

3. The tile or panel according to claim 1, characterized in that the inlay (14) and/or the optical wave guide (30) is/are polished in a region of said side surface which contacts said optical wave guide (30).

4. The tile or panel according to claim 1, characterized in that said underside of said optical wave guide (30) or said panel has a groove (54) for receiving a beam or group (56) of optical wave guides (30, 50, 52).

5. The tile or panel according to claim 1, characterized in that the underside or rear side of the inlay (14, 48) is rough or untreated.

6. The tile or panel according to claim 1, characterized in that the outer side or front side of the inlay (14, 48) is smooth or polished.

7. The tile or panel according to claim 1, characterized in that the underside or rear side of the inlay (14) is provided with a coloring layer (20).

8. The tile or panel according to claim 7, characterized in that the coloring layer (20) is a vapor-deposited layer of gold.

9. The tile or panel according to claim 7, characterized in that the coloring layer is a color layer that is either varnished or bonded.

10. The floor or wall covering of claim 1 wherein at least one tile and/or at least one panel being treated by one of coloring, polishing, roughing, or varnishing.

11. The covering according to claim 10, characterized in that several optical wave guides (50, 52) are combined into a beam or group (56) and lead to a central light source (60).

* * * * *